H. S. Wiley,
Jointing Staves.
No. 77,151.            Patented Apr. 21, 1868.
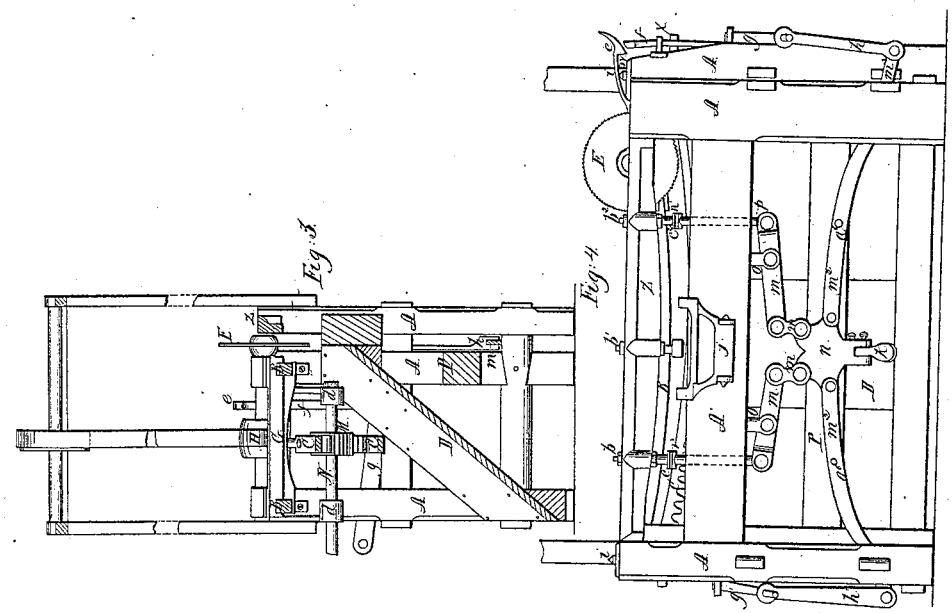
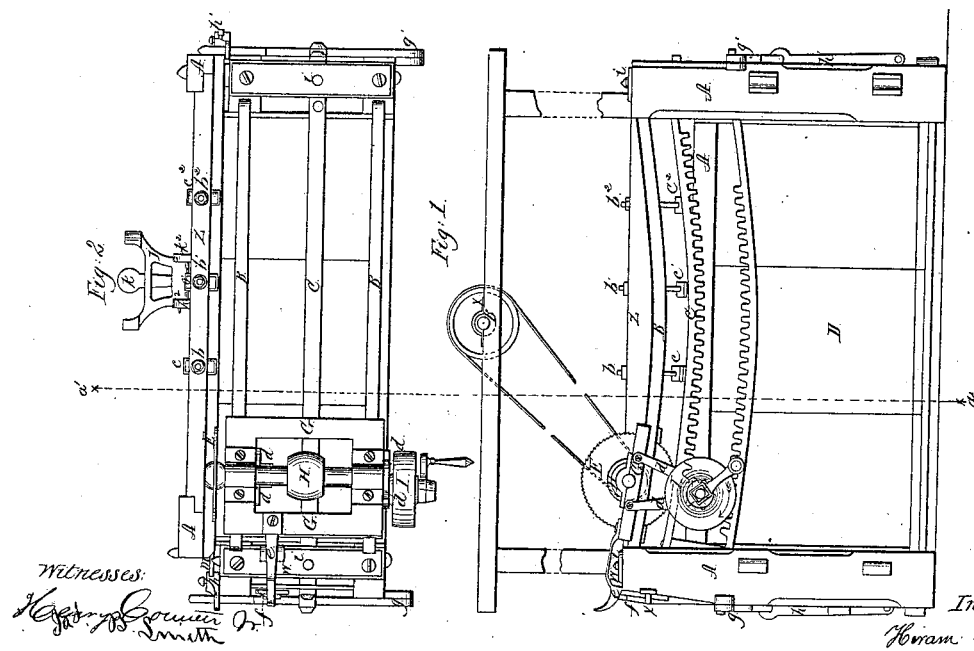
Witnesses:
Inventor,
Hiram S. Wiley.

United States Patent Office.

HIRAM S. WILEY, OF MADISON, INDIANA.

Letters Patent No. 77,151, dated April 21, 1868.

---

IMPROVEMENT IN MACHINES FOR JOINTING STAVES.

---

*The Schedule referred to in these Letters Patent and making part of the same.*

---

TO ALL WHOM IT MAY CONCERN:

Be it known that I, HIRAM S. WILEY, of Madison, in the county of Jefferson, and State of Indiana, have invented a new and improved Stave-Jointer; and I do hereby declare that the following is a full, clear, and exact description thereof, which will enable others skilled in the art to make and use the same, reference being had to the accompanying drawings, forming part of this specification.

Figure 1 is a rear elevation.

Figure 2 is a ground plan of the same.

Figure 3 is a transverse section through the line $a\ a'$, figs. 1 and 2.

Figure 4 is a front elevation.

Similar letters of reference indicate corresponding parts.

The nature of this invention consists—

First, in the arrangement of a movable circular saw for jointing staves, which traverses in a downward curve, corresponding with and conforming to the curve in the stave.

The guides which conduct the saw forward and backward are true arcs of circles, and concentric with the driving-pulley over head, so that the belt is always kept tight at any part of the travel of the saw-frame along its guides.

Second, it consists in a slight lateral curve given to the said guides, whereby a slight uniform curve is left in the edge of the stave, which adapts it more readily to the bilge requisite in a cask or barrel.

Third, the arrangement of the curved guides, toothed racks, and the connections for producing the forward and backward movement of the saw-frame and saw, as hereinafter explained.

A is the general frame of the machine. The saw, E, is set in bearings secured to a movable bed or frame, G, which slides along upon the curved guides, B B, these guides being circular arcs, and concentric with the driving-pulley shaft, B*, overhead, as shown in fig. 1, so that the small pulley, H, will be kept always at the same distance from the driving-pulley, and consequently the belt will remain tight. These curved guides B B are made adjustable up or down, by being turned down vertically at their ends, which are secured with screws into vertical slots made in the stanchions A A, forming part of the general frame of the machine.

Underneath the guides B B, and parallel to them, are two curved toothed racks, which are also concentric with the driving-pulley shaft above the machine, so that the pinion M, fig. 3, upon the shaft N, which rests in hanging bearings $d\ d$, which latter are secured to and form a part of the saw-bed, G, will engage the teeth on the racks C C, and thus move the saw-bed forward and backward, according as the said pinion is thrown into the upper or lower rack.

There is a crank-handle and small pulley, I, figs. 1 and 2, upon the shaft N of said pinion, so that the saw can be operated backward and forward by hand or power that drives the saw.

To accomplish this forward and backward movement of the saw by means of the said toothed racks or arcs C C, these racks or arcs are made to move up and down upon vertical guide-rods $i\ i$, which are rigidly secured in the cross-pieces of the general frame A, and are shown in figs. 1, 2, and 3.

The device for raising and lowering these racks, and thus moving the saw back and forth in the line of its work, consists of a system of levers and links or vibrating-arms, shown at $h\ h'$, $g\ g'$, $m^2\ m^2$, which are connected with the treadle $k$ by the plate $n$, having lugs to which the levers $m^2\ m^2$ are attached by pivots, thus receiving their motion from the attendant's foot when placed upon the treadle $k$.

When the treadle $k$ is depressed, the outer ends of the levers $m^2\ m^2$ are raised, as also the links or rods $h'\ h$, and also their attached links or rods $g\ g'$, which latter strike or impinge upon the ends of the lower toothed rack C, and as both racks are rigidly secured together at their ends by cross-bars, they are raised simultaneously, and when so raised, the upper teeth of the rack are disengaged from the pinion, and the lower teeth are brought in contact and engage the under side of the pinion, which produces a reversed motion in the saw-bed G. Thus by raising and lowering the toothed racks, a backward and forward motion of translation is produced, whereby the saw is made to saw through the length of the stave, and return to its first position, to again repeat the work an indefinite number of times, according as the treadle is raised or depressed by the foot of the attendant. This operation is shown mainly in figs. 1 and 4.

To hold the stave or wood to be sawed, two clamps are thrust upward by the action of the same treadle, which clamps confine the stave against other clamps inserted above them, and are made adjustable by means of nuts, which secure them to a bar running the whole length of the machine, and forming a part of the exterior frame A' attached to the general frame A, and shown mainly at figs. 2 and 4.

The clamp-bar Z, figs. 2 and 4, containing the shanks of the clamps, $b\ b^1\ b^2$, bolted firmly through it, is secured at each end to the stanchions A' A' of the general clamp-frame. The lengths of the shanks of these clamps conform to the curve of the stave, being adjusted for that purpose.

Directly underneath is a heavy bar or beam, A', fig. 4, which is a part of the clamp-frame, and has holes in it, through which the lower movable clamps play, when operated by the treadle $k$, thus moving up and down. These movable clamps, $r\ r'$, have longer shanks, $p\ p$, which, passing through the holes in the bar A', are pivoted to levers $m\ m$, which vibrate upon rigid pivots or centres $o\ o$ attached to the bar A', and whose opposite ends are connected with the plate $n$ by means of short links $m^1\ m^1$, thus connecting the clamps with the treadle $k$, and causing the stave to be clamped and held for the forward or cutting-motion of the saw.

The gauge J attached to the bar A' is a device for getting the staves all of equal width.

The catch $e$, attached to the saw-bed G, serves to catch upon the cross-bar in figs. 2 and 4, and thus holds the same stationary, till liberated by the upward motion of the wiper $f$, passing through the guide $x$, and attached at its lower end to the lever $g$, thus preventing the breaking of the machine if the catch should not be thrown off by the attendant before the pinion was thrown in gear with the lower toothed rack.

An inclined chute or apron, D, is placed underneath the saw, to receive the saw-dust and strips cut off, and deliver them out of the machine.

In operating this machine, the stave is placed on the lower clamps, and the treadle pressed upon with the foot, which action clamps the stave securely, and throws the pinion in gear with the lower toothed rack, which moves the saw forward through the wood or stave. The foot is then removed, and the pinion falls into gear with the descending toothed rack, which carries the saw back to its first position. Another stave is clamped. So the operation is repeated indefinitely.

The clamps for holding the stave have their clamping-faces inclined at an angle to the plane of the saw, which thus cuts the edge of the stave with a suitable bevel for setting up into a cask or barrel.

The advantages of this invention consist in the simplicity of its construction, and the combination of movements which insures regularity, ease of operation, and uniformity of work, while it saves time, and admits of being attended by less skilled operatives than those machines heretofore known or used.

Having thus described my invention, what I claim as new, and desire to secure by Letters Patent, is—

1. The curved guides B B, carrying the movable saw-frame G, said guides being concentric with the driving-shaft placed above the frame, whereby the tension of the belt from said driving-shaft to the pulley H on the saw-carriage is regulated, as herein shown and described for the purpose specified.

2. The combination of the movable curved racks C C with the pinion M and the movable saw-bed G, substantially in the manner herein shown and described.

3. The devices $m^2\ m^2$, $m\ m$, $h\ h'$, $g\ g$, $n$, and the treadle $k$, for operating the curved racks C C, working together, substantially as herein shown.

4. The clamps $c\ c'\ c$, $r\ r'$, and their connections $m\ m$, $m^1\ m^1$, for operating the same, as substantially set forth.

5. The combination of the catch $e$ and its wiper $f$ with the saw-bed and lifting-devices, substantially as herein shown and described.

HIRAM S. WILEY.

Witnesses:
 W. S. WYMOND,
 P. E. TRIM.